United States Patent
Hsieh

(10) Patent No.: US 8,165,708 B2
(45) Date of Patent: Apr. 24, 2012

(54) CUSTOMIZED MANUFACTURING METHOD FOR AN OPTOELECTRICAL DEVICE

(75) Inventor: Min-Hsun Hsieh, Hsinchu (TW)

(73) Assignee: Epistar Corporation, Hsinchu (TW)

( * ) Notice: Subject to any disclaimer, the term of this patent is extended or adjusted under 35 U.S.C. 154(b) by 362 days.

(21) Appl. No.: 12/379,556

(22) Filed: Feb. 25, 2009

(65) Prior Publication Data

US 2009/0216356 A1    Aug. 27, 2009

(30) Foreign Application Priority Data

Feb. 26, 2008 (TW) ................................ 97106746 A

(51) Int. Cl.
*G06F 19/00* (2011.01)
(52) U.S. Cl. ........................................ 700/117; 438/597
(58) Field of Classification Search .................. 700/117, 700/121; 438/597
See application file for complete search history.

(56) References Cited

U.S. PATENT DOCUMENTS

| | | | | |
|---|---|---|---|---|
| 5,428,704 A * | 6/1995 | Lebby et al. ..................... | 385/92 |
| 6,636,185 B1 * | 10/2003 | Spitzer et al. .................... | 345/8 |
| 7,075,113 B2 * | 7/2006 | Wu .................................. | 257/91 |
| 7,236,845 B2 * | 6/2007 | Ludwicki et al. ............. | 700/106 |
| 7,557,367 B2 * | 7/2009 | Rogers et al. ...................... | 257/9 |
| 7,623,935 B2 * | 11/2009 | Cohen et al. ..................... | 700/95 |
| 7,742,834 B2 * | 6/2010 | Matsushita et al. ........... | 700/110 |
| 7,799,699 B2 * | 9/2010 | Nuzzo et al. .................. | 438/758 |
| 7,906,905 B2 * | 3/2011 | Richardson et al. .......... | 313/512 |
| 2003/0135297 A1 * | 7/2003 | Chang et al. ................... | 700/121 |
| 2005/0029525 A1 * | 2/2005 | Wu .................................. | 257/79 |
| 2005/0071036 A1 * | 3/2005 | Mitrovic ....................... | 700/121 |
| 2005/0071038 A1 * | 3/2005 | Strang ........................... | 700/121 |
| 2005/0164432 A1 * | 7/2005 | Lieber et al. .................. | 438/149 |
| 2005/0171625 A1 | 8/2005 | Denton | |
| 2006/0292846 A1 * | 12/2006 | Pinto et al. .................... | 438/597 |
| 2007/0026645 A1 * | 2/2007 | Lieber et al. .................. | 438/478 |
| 2007/0032023 A1 * | 2/2007 | Lieber et al. .................. | 438/287 |
| 2007/0032052 A1 * | 2/2007 | Lieber et al. .................. | 438/500 |
| 2007/0048492 A1 * | 3/2007 | Lieber et al. .................... | 428/98 |
| 2007/0182324 A1 * | 8/2007 | Richardson et al. .......... | 313/512 |
| 2007/0276528 A1 * | 11/2007 | Matsushita et al. ........... | 700/110 |
| 2008/0100732 A1 * | 5/2008 | Minamio et al. .............. | 348/294 |
| 2008/0125902 A1 * | 5/2008 | Lin et al. ....................... | 700/121 |
| 2008/0128696 A1 * | 6/2008 | Chiang et al. ................... | 257/48 |
| 2008/0210294 A1 * | 9/2008 | Moslehi ......................... | 136/251 |
| 2008/0264477 A1 * | 10/2008 | Moslehi ......................... | 136/255 |

FOREIGN PATENT DOCUMENTS

CN    1780003 A    5/2006
TW    I251766      3/2006

* cited by examiner

*Primary Examiner* — Albert Decady
*Assistant Examiner* — Anthony Whittington
(74) *Attorney, Agent, or Firm* — Bacon & Thomas, PLLC

(57) ABSTRACT

The disclosure provides a customized manufacturing method for an optoelectrical device. The customized manufacturing method comprises the steps of providing a manufacturing flow including a front-end flow, a customized module subsequent to the front-end flow, and a pause step between the front-end flow and the customized module, processing a predetermined amount of semi-manufactured products queued at the pause step, tuning the customized module in accordance with a customer's request, and processing the semi-manufactured products by the tuned customized module to fulfill the customer's request.

6 Claims, 6 Drawing Sheets

CUSTOMIZED MANUFACTURING METHOD FOR AN OPTOELECTRICAL DEVICE

RELATED APPLICATION

The present application claims the right of priority based on Taiwan Application Serial Number 097106746, filed Feb. 26, 2008, the disclosure of which is incorporated herein by reference in its entirety.

BACKGROUND

1. Technical Field

The present disclosure relates to a customized manufacturing method for optoelectrical devices.

2. Description of the Related Art

Semiconductor optoelectrical devices (ODs) such as light-emitting diodes (LED) or solar cells have been extensively recognized because of their effectiveness in cost saving or capability to generate energy with less pollution. Global environment organizations and governments have scheduled to implement such devices to resolve the problem of global warming. As the demand rapidly grows, traditional manufacturing factory that manufactures in a manually or semiautomatic way has to face the challenges of shorter delivery period to customers and product/specification diversity for versatile applications. Besides the expansion of product lines in response with the fast growing demand and the diverse applications, an efficient process flow and swift response to customer's request are also urged to be improved.

SUMMARY OF THE DISCLOSURE

The disclosure provides a customized manufacturing method for optoelectrical devices. The method considers both customer's request and efficient manufacture to accelerate the industry implementation.

The present disclosure provides a customized manufacturing method for optoelectrical devices. The customized manufacturing method comprises the steps of providing a manufacturing flow including a front-end flow, a customized module subsequent to the front-end flow, and a pause step between the front-end flow and the customized module, processing a predetermined amount of semi-manufactured products queued at the pause step, tuning the customized module in accordance with a customer's request, and processing the semi-manufactured products by the tuned customized module to fulfill the customer's request.

In accordance with one embodiment of the present disclosure, the customer's request comprises a requirement of brightness.

In accordance with one embodiment of the present disclosure, the customer's request comprises a requirement of light-field shape or light-field angle.

In accordance with one embodiment of the present disclosure, the customer's request comprises a requirement of luminous wavelength.

In accordance with one embodiment of the present disclosure, the customer's request comprises a requirement of thermal resistance.

In accordance with one embodiment of the present disclosure, the customized module comprises a pre-formed lookup table or relation curve for tuning the customized module.

In accordance with one embodiment of the present disclosure, the optoelectrical device comprises light-emitting diode or solar cell.

DETAILED DESCRIPTION OF THE EMBODIMENTS

Figure 1:
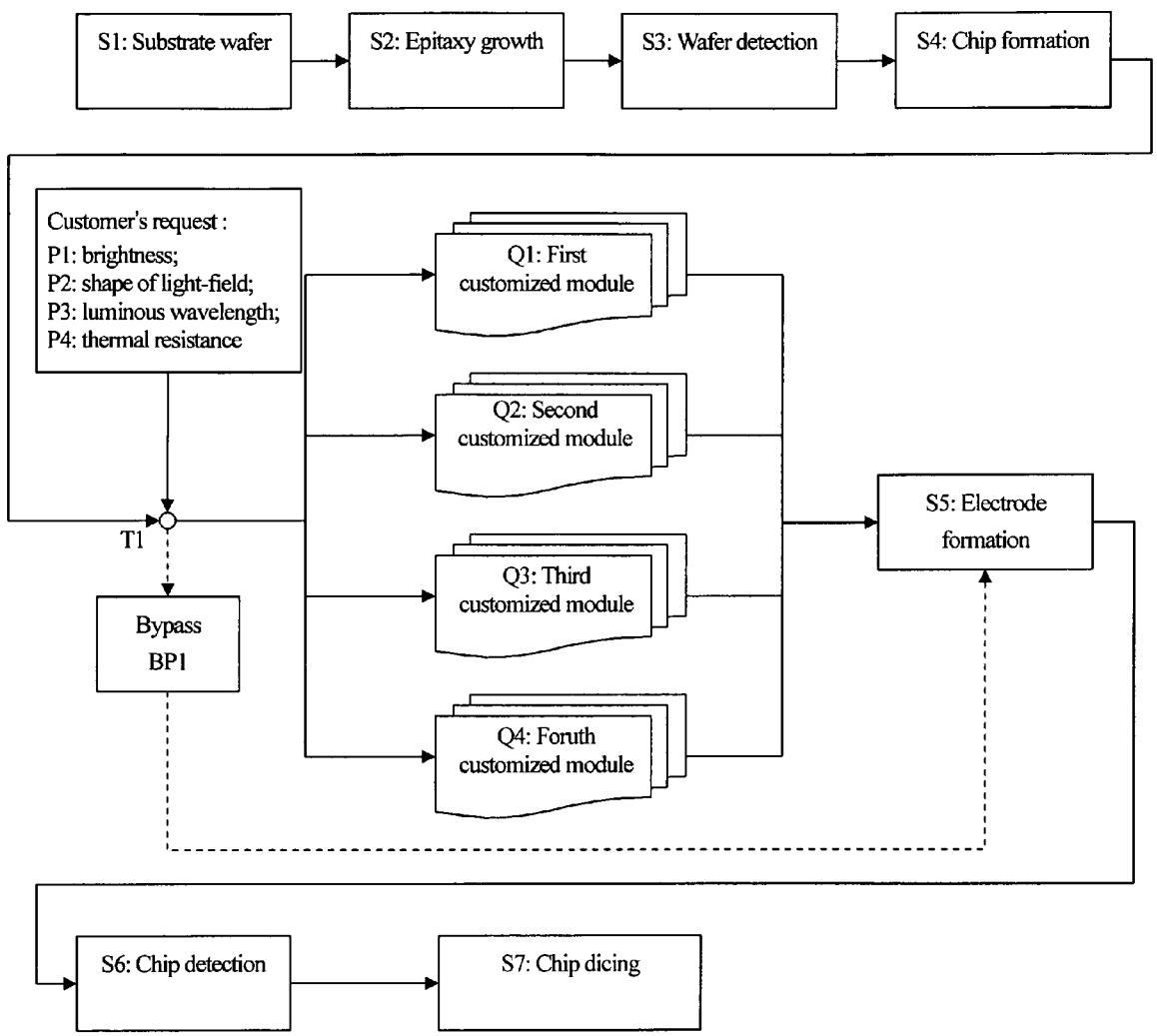
FIG. 1 is a flow chart illustrating the customized manufacturing method in accordance with one embodiment of the present disclosure.

FIG. 1 describes a customized manufacturing method in accordance with one embodiment of the present disclosure comprises a manufacturing flow having steps S1 to S7, a group of customized modules Q1 to Q4 interposed between steps S4 and S5, and a pause step T1 before each of modules Q1 to Q4. Each of the steps and modules are described in detail hereinafter:

Step S1 (Substrate wafer): providing a substrate wafer for growing a semiconductor epitaxy stack. The substrate wafer comprises a GaAs wafer for growing AlGaInP-based materials, or sapphire, GaN, or SiC wafer for growing InGaN-based materials, or Si, Ge, or GaAs wafer for growing III-V photovoltaic stack.

Step S2 (Epitaxy growth): growing an epitaxial stack having optoelectrical property on the substrate wafer, for example, a light-emitting stack or photovoltaic stack.

Step S3 (Wafer detection): testing the epitaxial stack on the substrate wafer by a wafer tester to detect whether the optoelectrical criteria is met or not. The optoelectrical criteria comprise the current value in a fixed voltage or the luminous wavelength features, such as peak wavelength, or half-peak width.

Step S4 (Chip formation): defining a plurality of chip regions and electrode regions on the substrate wafer by lithography and etching processes.

Module Q1 (First customized module): tuning first customized module Q1 in response to a customer's requirement of brightness P1 for customer's acceptance. The detail of the first customized module Q1 will be described subsequently.

Module Q2 (Second customized module): tuning second customized module Q2 in response to a customer's requirement of light-field P2 for customer's acceptance. The detail of the second customized module Q2 will be described subsequently.

Module Q3 (Third customized module): tuning third customized module Q3 in response to a customer's requirement of luminous wavelength P3 for customer's acceptance. The detail of the third customized module Q3 will be described subsequently.

Module Q4 (Fourth customized module): tuning fourth customized module Q4 in response to a customer's requirement of thermal resistance P4 for customer's acceptance. The detail of the fourth customized module Q4 will be described subsequently.

Step S5 (Electrode formation): forming a p-side and an n-side electrode on each of the electrode regions of the chips for electrically connecting to external circuits.

Step S6 (Chip detection): testing the chips on the wafer by a chip tester to detect whether the optoelectrical criteria is met or not. The optoelectrical criteria comprise the current value in a fixed voltage, the luminous wavelength features, such as peak wavelength, or half-peak width.

Step S7 (Chip dicing): after the above-mentioned manufacturing flow, dicing the wafer to form chips to accomplish the customized optoelectrical device that fulfills the customer's request.

For better interpretation, the manufacturing flow before the pause step T1 is generally called the front-end flow, the manufacturing flow after the customized module is generally called the subsequent flow. The pause step T1 in-between the front-end flow and the step of the customized module is for preserving semi-manufactured products fabricated from the front-end flow. Upon receiving the customer's request, the semi-manufactured products are released for the corresponding customized module in accordance with the customer's request. Furthermore, the pause step comprises timing the queued time of the semi-manufacturing products preserved at the pause step T1 and setting up a predetermined critical time. When the queued time is less than the predetermined critical time, the semi-manufactured products proceed to process by the corresponding customized module in response to the customer's request. If the customer's request has not been received or confirmed when the queued time is equal to or more than the predetermined critical time, the semi-manufactured products proceed to the by-pass step BP1 and directly jumped to the subsequent flow.

FIG. 2 to FIG. 5 further disclose the customized modules Q1 to Q4 shown in FIG. 1.

Figure 2:
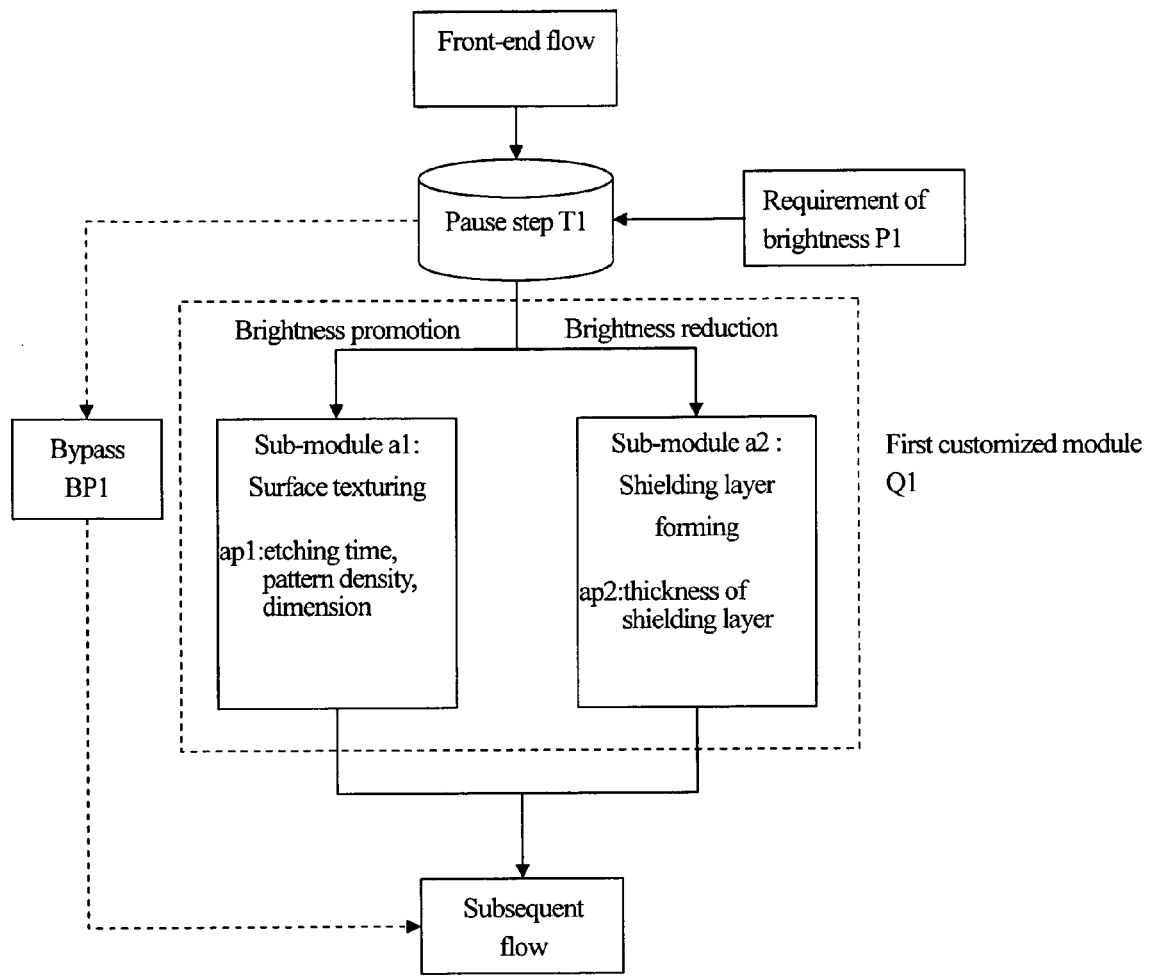
FIG. 2 is a flow chart further illustrating the first customized module Q1.

FIG. 2 further discloses the first customized modules Q1 shown in FIG. 1. First, a certain amount of the semi-manufactured products processed by the front-end flow are preserved at the pause step T1, and are released for the first customized module Q1 while a customer's request about the requirement of brightness P1 is received. The first customized module Q1 comprises a sub-module a1 and a sub-module a2 corresponding to the requirement of brightness promotion and the requirement of brightness reduction respectively. The promotion or reduction of brightness is compared with the standard product not processed by any customized modules. The sub-module a1 comprises a step of surface texturing by the traditional lithography/etching process to form a rough surface or a patterned surface with a regular or irregular surface on the epitaxial stack or the substrate wafer for brightness promotion. The roughness of the rough surface or the pattern of the patterned surface can be achieved by tuning a customized parameter ap1 such as etching time, pattern density, or pattern dimension. The sub-module a1 further comprises a pre-formed lookup table or relation curve recording the corresponding relationship between the values of the customized parameter ap1 and the values of brightness to be promoted such that the requirement of brightness promotion can be achieved by selecting the corresponding value of the corresponding customized parameter according to the customer's request. The sub-module a2 comprises a step of forming a shielding layer by depositing a thin metal film on the epitaxial stack for absorbing a proportion of light emitting from the epitaxial stack for brightness reduction. The effect of the shielding layer can be altered by tuning a customized parameter ap2 such as the thickness of the shielding layer. The sub-module a2 further comprises a pre-formed lookup table or relation curve recording the corresponding relationship between the values of the customized parameter ap2 and the values of brightness to be reduced such that the requirement of brightness reduction can be achieved by selecting the corresponding value of the customized parameter according to the customer's request.

Figure 3:
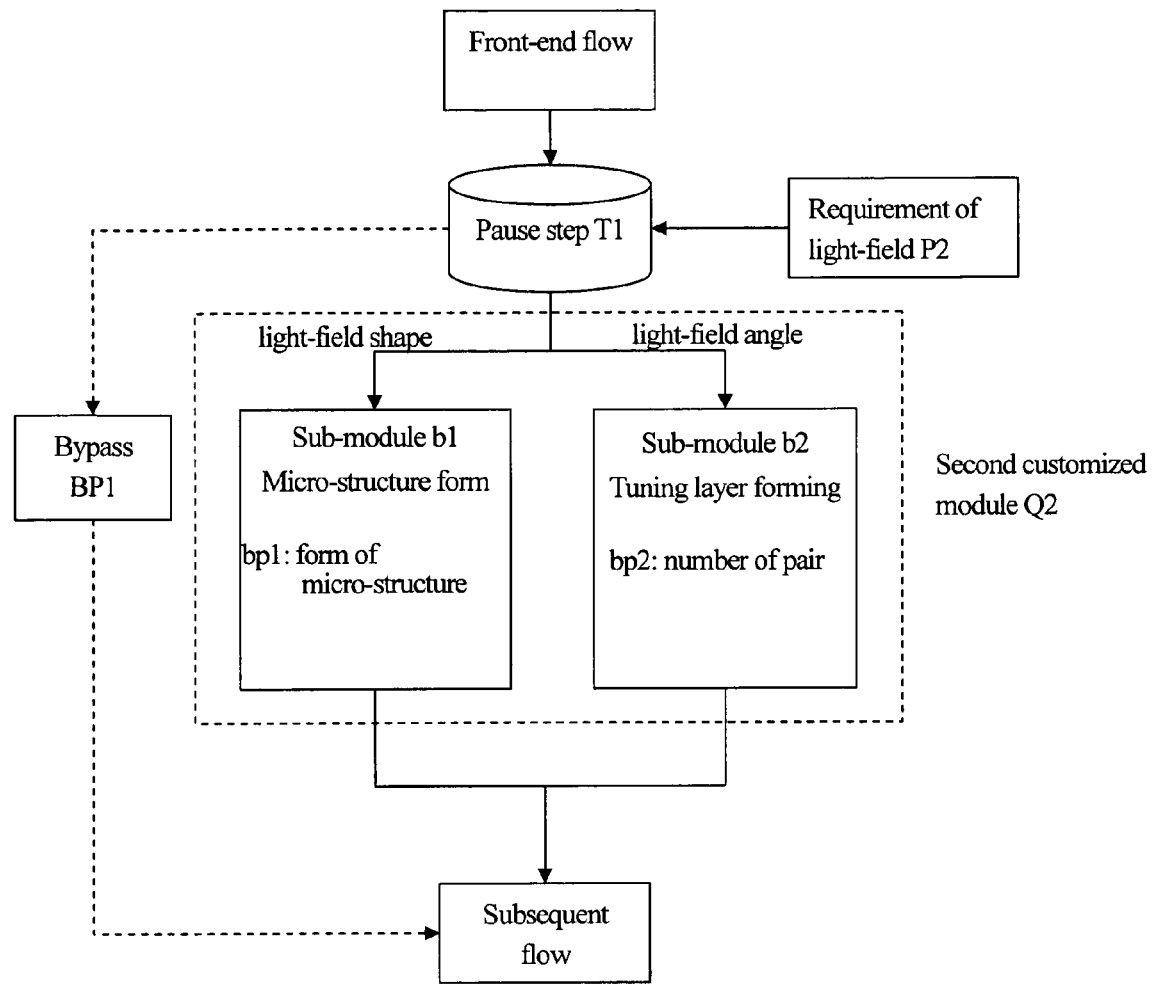
FIG. 3 is a flow chart further illustrating the second customized module Q2.

FIG. 3 further discloses the second customized modules Q2 shown in FIG. 1. First, a certain amount of the semi-manufactured products processed in the front-end flow are preserved at the pause step T1, and are released for the second customized module Q2 while a customer's request about the requirement of light-field P2 is received. The second customized module Q2 comprises a sub-module b1 and a sub-module b2 corresponding to the requirement of light-field shape and light-field angle respectively. The sub-module b1 comprises a step of forming a micro-structure layer on or within the epitaxial stack to meet the requirement of light-field shape. The light-field shape can be adjusted by tuning the form of the micro-structure such as an irregular surface on the micro-structure for forming a scattering light-field shape, the micro-structure with photonics crystal for forming a coaxial light-field shape, or a slanted surface on the micro-structure for forming a side light-field shape. The sub-module b1 further comprises a pre-formed lookup table for selecting the corresponding form of the micro-structure according to the customer's request to meet the requirement of the light-field shape. The sub-module b2 comprises a step of forming a tuning layer of light-field angle on or within the epitaxial stack for the requirement of light-field angle. The tuning layer comprises a multi-layered structure having varied refraction indices on or within the epitaxial stack to make the light-field angle convergent or divergent. For example, the tuning layer comprises alternate stacked $SiO_2/Si_3N_4$ layers, and the light-field angle can be adjusted by tuning a customized parameter bp2 such as the number of pair of the stacked $SiO_2/Si_3N_4$ layers. The sub-module b2 further comprises a pre-formed lookup table or relation curve recording the corresponding relationship between the values of the customized parameter bp2 and the values of light-field angle such that the requirement of light-field angle can be achieved by selecting the corresponding value of the customized parameter according to the customer's request.

Figure 4:
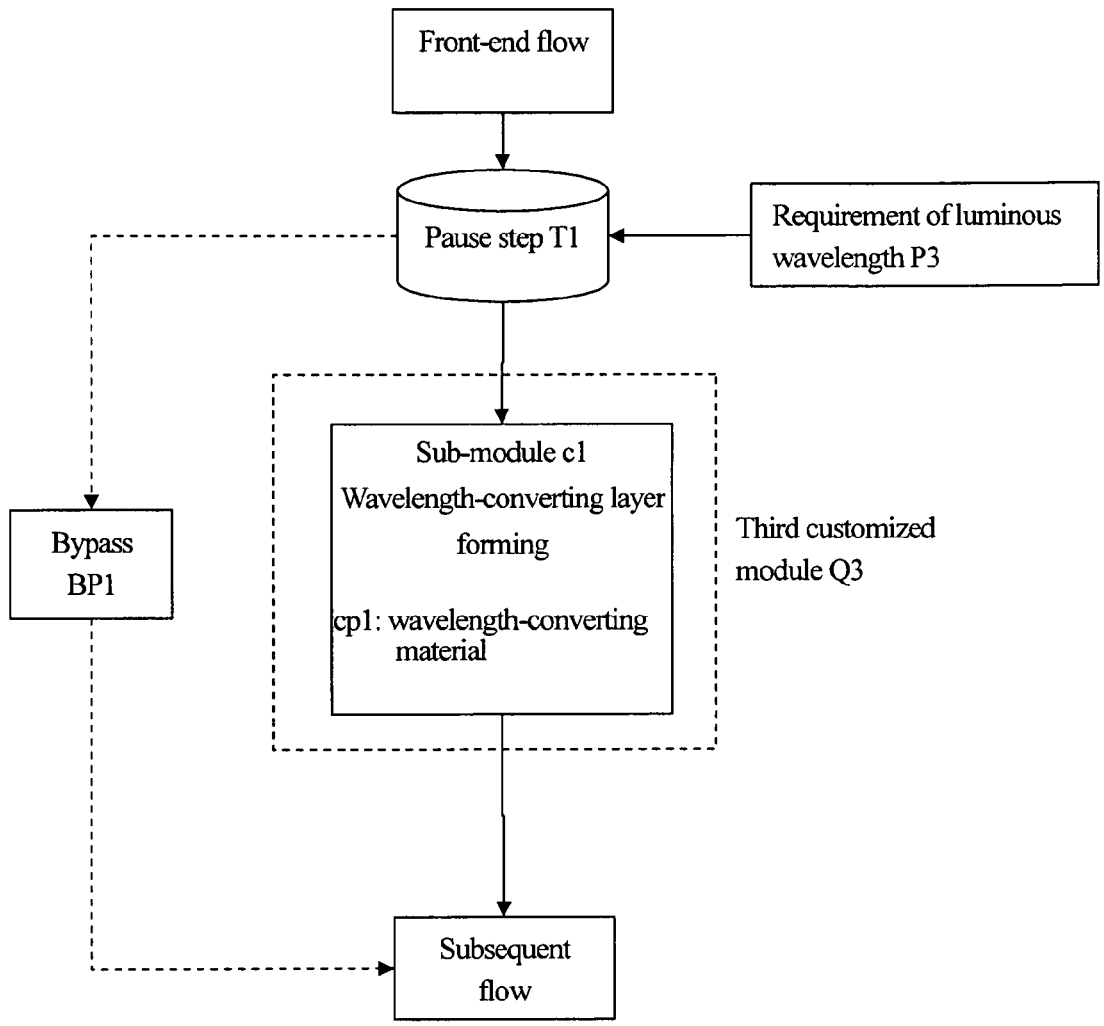
FIG. 4 is a flow chart further illustrating the third customized module Q3.

FIG. 4 further discloses the third customized modules Q3 shown in FIG. 1. First, a certain amount of the semi-manufactured products processed in the front-end flow are preserved at the pause step T1, and are released for the third customized module Q3 while a customer's request about luminous wavelength P3 is received. The third customized module Q3 comprises a sub-module c1 corresponding to the requirement of luminous wavelength. The sub-module c1 comprises a step of forming a wavelength-converting layer on or within the epitaxial stack to meet the requirement of luminous wavelength. The luminous wavelength can be adjusted by tuning a customized parameter cp1 such as the selection of a proper wavelength-converting material for converting the wavelength of light emitted from the epitaxial stack, ex. 390 to 460 nm near-UV or blue light, into wavelength spectrum of green, orange, or red light. The sub-module c1 further comprises a pre-formed lookup table for selecting the corresponding wavelength-converting material according to the customer's request to meet the requirement of the luminous wavelength.

Figure 5:
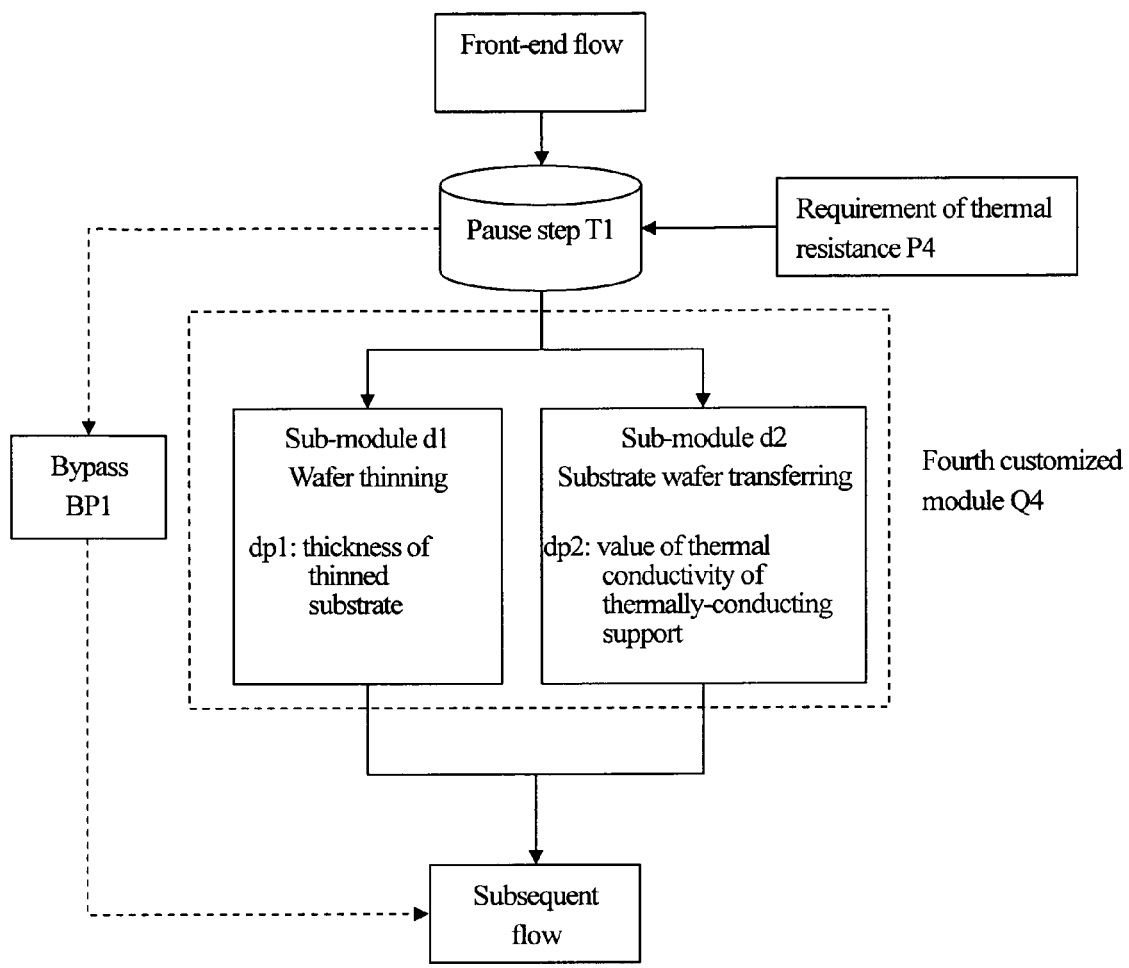
FIG. 5 is a flow chart further illustrating the fourth customized module Q4.

FIG. 5 further discloses the fourth customized modules Q4 shown in FIG. 1. First, a certain amount of the semi-manufactured products processed in the front-end flow are preserved at the pause step T1, and are released for the fourth customized module Q4 while a customer's request about thermal resistance P4 is received. The fourth customized module Q4 comprises a sub-module d1 and a sub-module d2. The sub-module d1 comprises a step of thinning the substrate wafer with the epitaxial stack formed thereon or removing the substrate wafer from the epitaxial stack to reduce the thermal resistance of the optoelectrical device. The thermal resistance can be adjusted by tuning a customized parameter dp1 such as the thickness of the thinned substrate wafer to meet the requirement of thermal resistance. The sub-module d1 further comprises a pre-formed lookup table or relation curve that records the corresponding relationship between the values of the customized parameter dp1 and the values of thermal resistance such that the requirement of thermal resistance can be achieved by selecting the corresponding value of the customized parameter according to the customer's request. The sub-module d2 comprises a step of transferring substrate wafer by firstly selecting and bonding a thermally-conducting support to the epitaxial stack, and then removing the substrate wafer. The thermal resistance can be adjusted by tuning a customized parameter dp2 such as the thermal conductivity of the thermally-conducting support to meet the requirement of thermal resistance. The sub-module d2 further comprises a pre-formed lookup table recording the corresponding relationship between the values of the customized parameter dp2 and the values of thermal resistance such that the requirement of thermal resistance can be achieved by selecting the corresponding value of the customized parameter according to the customer's request.

Figure 6:
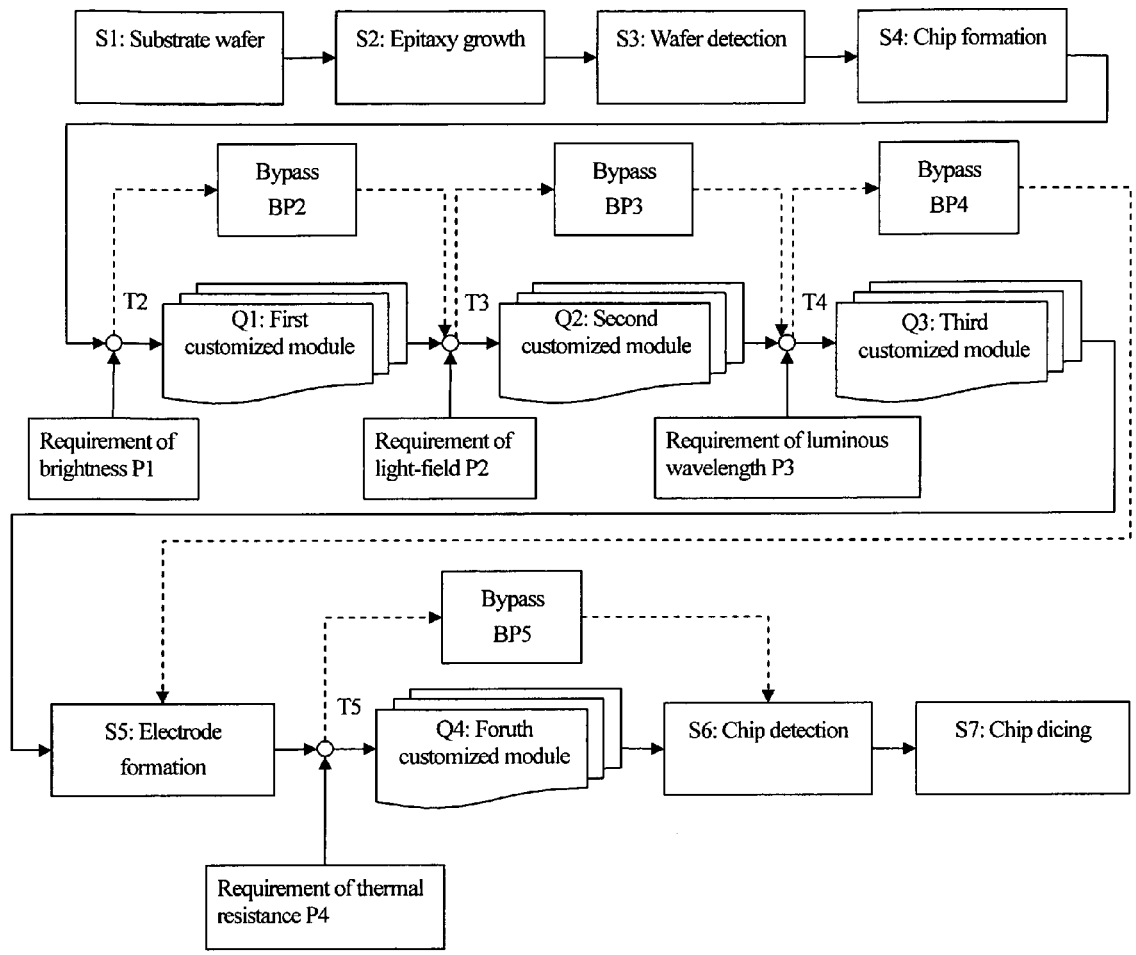
FIG. 6 is a flow chart illustrating the customized manufacturing method in accordance with another embodiment of the present disclosure.

FIG. 6 describes another customized manufacturing method in accordance with the present disclosure. The first to third customized modules Q1~Q3 are arranged successively between step S4 and S5. The fourth customized module Q4 is between Step S5 and S6. Pause step T2 to T5 are arranged before each of the corresponding customized modules Q1~Q4. Each of the pause steps T2~T5 comprises timing the queued time of the semi-manufacturing products preserved in the pause step and setting up a predetermined critical time. When the queued time is less than a predetermined critical time, the semi-manufactured products are released to be processed by the corresponding customized module in response to the customer's request. The predetermined critical time is about 1 to 90 days, 1 to 30 days, 1 to 7 days, or less than 24 hours. In other words, for the quality control purpose, it is preferred to release the semi-manufactured products that have been hold for a period shorter than the predetermined critical time to the customized module. If the customer's request has not been received or confirmed when the queued time is equal to or more than the predetermined critical time, the semi-manufactured products proceed to the corresponding by-pass step BP2~BP5 and directly jumped to the subsequent flow.

Also, it will be apparent to those having ordinary skill in the art that various modifications and variations can be made to the methods in accordance with the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for manufacturing an optoelectronic device comprising the steps of:
   providing a growth wafer;
   growing an epitaxial stack having optoelectrical properties on the growth wafer to form a semi-manufactured product;
   detecting the optoelectrical criteria of the semi-manufactured product;
   forming a plurality of chip regions on the growth wafer;
   forming a p-side electrode and an n-side electrode on each of the chip regions;
   providing a predetermined request with respect to a customized module; and
   processing the semi-manufactured product by the customized module in response to the predetermined request.

2. The method for manufacturing an optoelectronic device according to claim 1, further comprising a step of comparing the optoelectrical criteria with the predetermined request.

3. The method for manufacturing an optoelectronic device according to claim 1, further comprising a step of dicing the growth wafer to form a plurality of chips.

4. A method for manufacturing an optoelectronic device comprising the steps of:
   providing a growth wafer;
   growing an epitaxial stack having optoelectrical properties on the growth wafer to form a semi-manufactured product;
   detecting the optoelectrical criteria of the semi-manufactured product;
   providing a predetermined request with respect to a customized module; and
   processing the semi-manufactured product by the customized module in response to the predetermined request,
   wherein the step of processing the semi-manufactured products by a corresponding customized module is tuning a parameter according to a pre-formed lookup table or relation curve of the customized module.

5. The method for manufacturing an optoelectronic device according to claim 1, wherein the optoelectrical criteria comprises the current value, peak wavelength, or half-peak width.

6. The method for manufacturing optoelectronic device according to claim 1, wherein the predetermined request is selected from the group consisting of brightness, light-field, luminous wavelength, and thermal resistance.

* * * * *